United States Patent
Amir et al.

(10) Patent No.: US 8,776,078 B2
(45) Date of Patent: Jul. 8, 2014

(54) METHOD FOR DYNAMICALLY FREEING COMPUTER RESOURCES

(75) Inventors: Arnon Amir, Saratoga, CA (US);
Nimrod Megiddo, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 1386 days.

(21) Appl. No.: 12/123,516

(22) Filed: May 20, 2008

(65) Prior Publication Data

US 2009/0293062 A1 Nov. 26, 2009

(51) Int. Cl.
*G06F 9/46* (2006.01)
*G06F 3/00* (2006.01)
*G06F 3/048* (2013.01)

(52) U.S. Cl.
USPC ........... 718/107; 718/100; 718/102; 718/104; 718/105; 718/108; 715/700; 715/778; 715/779; 715/781; 715/789

(58) Field of Classification Search
None
See application file for complete search history.

(56) References Cited

U.S. PATENT DOCUMENTS

| | | | | |
|---|---|---|---|---|
| 4,688,167 A * | 8/1987 | Agarwal | ......... | 715/803 |
| 4,967,353 A * | 10/1990 | Brenner et al. | ......... | 711/160 |
| 5,125,086 A * | 6/1992 | Perazzoli, Jr. | ......... | 711/159 |
| 5,386,536 A * | 1/1995 | Courts et al. | ......... | 711/136 |
| 5,394,537 A * | 2/1995 | Courts et al. | ......... | 711/202 |
| 5,499,354 A * | 3/1996 | Aschoff et al. | ......... | 711/129 |
| 5,563,648 A * | 10/1996 | Menand et al. | ......... | 725/142 |
| 5,572,694 A * | 11/1996 | Uchino | ......... | 718/1 |
| 5,606,685 A * | 2/1997 | Frandeen | ......... | 711/117 |
| 5,611,064 A * | 3/1997 | Maund et al. | ......... | 711/209 |
| 5,630,097 A * | 5/1997 | Orbits et al. | ......... | 711/165 |
| 5,727,178 A * | 3/1998 | Pletcher et al. | ......... | 711/202 |
| 6,078,942 A * | 6/2000 | Eisler et al. | ......... | 718/100 |
| 6,247,042 B1 * | 6/2001 | Engstrom et al. | ......... | 718/107 |
| 6,842,901 B1 | 1/2005 | Miller | | |
| 7,143,413 B2 | 11/2006 | McCarthy et al. | | |
| 7,512,952 B1 * | 3/2009 | Liu et al. | ......... | 718/108 |
| 7,958,453 B1 * | 6/2011 | Taing | ......... | 715/744 |
| 2004/0194153 A1 * | 9/2004 | Garg et al. | ......... | 725/151 |
| 2005/0071777 A1 * | 3/2005 | Roessler et al. | ......... | 715/810 |
| 2007/0006078 A1 * | 1/2007 | Jewsbury et al. | ......... | 715/716 |
| 2007/0067776 A1 | 3/2007 | McCarthy et al. | | |
| 2008/0163104 A1 * | 7/2008 | Haug | ......... | 715/788 |
| 2009/0037348 A1 * | 2/2009 | Joshi et al. | ......... | 705/400 |
| 2009/0158134 A1 * | 6/2009 | Wang et al. | ......... | 715/222 |

OTHER PUBLICATIONS

"Method for Extending OS/2's Memory Management to Recognize 'User Focus'", IBM Technical Bulletin, vol. 35, No. 1A, Jun. 1992.

* cited by examiner

*Primary Examiner* — Charles Swift
(74) *Attorney, Agent, or Firm* — Gibb & Riley, LLC

(57) ABSTRACT

A method dynamically frees computer resources in a multi-tasking and windowing environment by activating a GUI widget to initiate pausing of an application, pausing CPU processing of the application code, maintaining data of the application in main memory, storing state information for the application code and a process of the application in mass storage, removing the application code from main memory to mass storage, when another application requires additional memory, activating another GUI widget to resume running of the application, restoring the state information for the code and the process to main memory before the application resumes running, and resuming the CPU processing of the application.

19 Claims, 5 Drawing Sheets

METHOD FOR DYNAMICALLY FREEING COMPUTER RESOURCES

BACKGROUND

1. Field of the Invention

Exemplary embodiments of the invention generally relate to a method of freeing computer resources by a user in a multitasking and windowing environment, and more particularly, to a method of pausing an open application program that includes pausing the processing of the open application program by the central processing unit and removing the program code of the open application program, which is paused, from main memory to mass storage, when another open application program requires additional main memory.

2. Description of the Related Art

Personal computers (PCs) can run numerous application programs simultaneously in a multitasking and windowing environment. An open application program requires operation of many computer resources, including, for example, a central processing unit (CPU), memory, an operating system, a task manager of the operating system, an Application Program Interfaces (API), and a Graphical User Interface (GUI). Memory is typically divided into main memory, that is, Random Access Memory (RAM), which responds quickly, and mass storage, for example, a hard disk, which responds more slowly but is relatively less expensive per unit of memory. A GUI is typically a computer display screen. An open application program has a portion of its computer code residing in main memory, so that the CPU may quickly implement or run the application program. The open application program may also store data, to which it frequently refers, in the main memory so as to further speed implementation of the program.

There exist trade-offs when trying to run numerous application programs simultaneously and quickly in a multitasking environment. To run as quickly as possible, an application program should store all of its program code and its data in the more quickly responding main memory, so as to avoid the longer access times associated with calls to mass storage. However, when running numerous application programs, or even some single application programs, there is typically not enough of the relatively more expensive main memory in which to store all of the applications program's code and data. Therefore, today's personal computers employ virtual memory management to speed running of numerous application programs by storing application program code and data, which is likely to be frequently accessed by the CPU, in main memory and by storing application program code and data, which is less likely to be frequently accessed in mass storage.

Virtual memory management solves the problem of speedily running numerous application programs by swapping code and data needed to run application programs back and forth between main memory and mass storage. For example, whenever instructions from a particular portion of program code are to be executed, the particular portion of program code is loaded into main memory. Other portions of program code may reside in mass storage, for example, a hard disk, until needed. If a particular portion of program code or data does not reside in main memory and access to that particular portion of program code or data is attempted, the CPU will generate a "not present" interrupt to notify the operating system of the problem. The operating system then directs loading of the absent particular portion of program code or data into an available area of main memory and restarts the interrupted application.

A counterpart to loading to-be-executed program code or data from mass storage to main memory occurs when a least frequently used portion of program code or data residing in main memory is sent to mass storage to make available main memory space for the to-be-executed program code or data. The swapping of program code and data to and from mass storage and main memory are transparent to the running open application program because the application program neither processes the interrupt, nor manages the swapping of program code and data between main memory and mass storage.

The application program only sees a virtual address space associated with the program code or data that resides in a virtual memory. The virtual memory management of the operating system then maps an application program's request for program code or data to a virtual memory address, which may be located in either of main memory or mass storage. The virtual memory management then swaps program code or data back and forth between main memory and mass storage to maintain the most frequently accessed program code or data in main memory.

An open application program is typically associated with the display of an application window and a task button. When several application programs are open, several corresponding application windows may be cascaded, stacked, displayed side by side or hidden behind one another on the display screen. Several open application programs are also associated with several corresponding task buttons located on a taskbar, usually displayed at the bottom or side of the display screen. A task button usually includes an icon and text to identify the open application program with which the task button is associated. A task button may also be used to minimize, maximize, and restore an application window and even to close, an open application program, its application window, and its task button.

As shown in FIG. 1, even when several application programs are open and several corresponding application windows and task buttons are displayed on a display screen 110, from the user's viewpoint, there is but a single application window containing a display or document with which the user may interact by, for example, mouse clicks, cursor movements, commands, text entry, scrolling, highlighting or printing. This single application window with which the user interacts is the active window 120. The task button 130 corresponding to the active window 120 is visually distinguished from other task buttons 150 corresponding to other inactive application windows 140. For example, the task button 130 associated with the active window 120 may be distinguished by a deeper shade. When several application programs are open, there is but one task button 130 corresponding to the active window 120, while the other task buttons 150, 160 are associated with inactive or minimized windows, respectively. However, each of the inactive windows 140 corresponding to the other open application programs may readily be switched from inactive to active by clicking on either the inactive window 140 or its corresponding task button 150. A task button 160, associated with a minimized window of another open application program, may also be readily switched to displaying an active window and its corresponding active task button, by clicking on the task button 160 associated with the minimized window.

While the user may not be interacting with an inactive application window, the open application program associated with this inactive widow is, however, still running and using the computer's main memory, CPU, and other resources. This situation has the undesirable effect of slowing down the open application program associated with the active window by reducing the amount of main memory available, the number of CPU cycles available per unit of time, and the availability of other computer resources. When there are several open application programs, each open application program further reduces the main memory, CPU cycles and other resources available to the open application program associated with the active window. Since the user is only interacting with the open application program displayed in the active window, the slowing down of this open application program is readily apparent. Of course, it is not only the open application program associated with the active window that is being slowed, it is all of the open application programs.

The slowing down of open application programs may be particularly evident when the user conducts a search on the Internet or accesses web services available on the Internet. When a user opens a web browser application, e.g., Internet Explorer Browser®, to view multiple web browser windows, each web browser window requires that a data structure, called a Document Object Model (DOM), be stored in the computer's main memory. Some web browser windows consume large amounts of the computer's main memory and CPU operations, even when the user is not interacting with the opened web browser's window. Web services, on the other hand, typically communicate using verbose XML messages, requiring much processing, between a client PC and a remote server.

When several application programs are opened, a user may speed the running of a selected open application program by closing one or more of the other open application programs to free computer resources. However, if the user then wishes to access one of these formerly closed application programs, this application program must be re-started by activating the application program's icon on the desktop, in the Start menu, or entering the application program's path on an address bar or the Start menu's run command. Upon re-starting the formerly closed application program, the operating system now must load at least a portion of the program code and data of the to-be-re-started application program into main memory, so that the program may be implemented by the CPU. Re-starting an application program is just like starting an application program anew and starting an application program takes longer than switching from an open application program with an inactive or minimized window to the same open application with an active window.

There remains a need to overcome the problem of the slowing down of open application programs, when multiple application programs are open, without necessarily closing one or more of the application programs and while maintaining a display presence of each of the application programs for the user.

SUMMARY

In view of the foregoing, an exemplary embodiment of the invention provides a method for dynamically freeing computer resources by a user in a multitasking and windowing environment, the method including: inputting, from a user, a first input to activate a first Graphical User Interface (GUI) widget, associated with an open application program, to initiate pausing of the open application program; pausing Central Processing Unit (CPU) processing of program code for the open application program; maintaining data associated with the open application program, at a time of pausing, in main memory; storing first state information, associated with the program code of the open application program and residing in the main memory at the time of pausing, in mass storage; at the time of pausing, storing second state information, associated with a process of the open application program and received from a software module that monitors running applications and processes, in the mass storage; and removing the program code of the open application program, which is paused, from the main memory to the mass storage, to dynamically free computer resources for the user when another open application program running in the multitasking and windowing environment requires additional main memory.

Another exemplary embodiment of the invention provides the method in which, the first GUI widget comprises an inactive window corresponding to the open application program, and the method further comprises displaying, in response to the user right clicking the inactive window, a paused window, which is visually distinguished from any of an inactive window and an active window.

Yet another exemplary embodiment of the invention provides the method in which, the displaying the paused window further comprises visually distinguishing the paused application window by differences in any of shape, color, location, shade, and graphics.

Yet another exemplary embodiment of the invention provides the method in which, the first GUI widget comprises a task button corresponding to the open application program, and the method further comprises displaying, in response to the user right clicking the task button, a pop-up window including an option of pausing.

Yet another exemplary embodiment of the invention provides the method in which, in response to the user selecting the option of pausing, the method further comprises displaying a paused task button, which is visually distinguished from a task button associated with an active window, a minimized window, and an inactive window.

Yet another exemplary embodiment of the invention provides the method in which, the displaying the paused task button further comprises visually distinguishing the paused task button by differences in any of shape, color, size, shade, and graphics.

Yet another exemplary embodiment of the invention provides a method for dynamically freeing computer resources by a user in a multitasking and windowing environment, the method including: inputting, from a user, a first input to activate a first Graphical User Interface (GUI) widget, associated with an open application program, to initiate pausing of the open application program; pausing Central Processing Unit (CPU) processing of program code for the open application program; maintaining data associated with the open application program, at a time of pausing, in main memory; storing first state information, associated with the program code of the open application program and residing in the main memory at the time of pausing, in mass storage; at the time of pausing, storing second state information, associated with a process of the open application program and received from a software module that monitors running applications and processes, in the mass storage; removing the program code of the open application program, which is paused, from the main memory to the mass storage, to dynamically free computer resources for the user when another open application program running in the multitasking and windowing environment requires additional main memory; inputting, from the user, a second input to a second GUI widget, associated with pausing the open application program, to resume running of the open application program; restoring the first state information, associated with the program code of the open application and stored in the mass storage, to the main memory before the open application program resumes running; restoring the second state information, associated with the process of the open application program and stored in the mass storage, to the main memory for access by the software module that monitors running applications and processes before the open application program resumes running; and resuming the CPU processing of the program code for the open application program.

Yet another exemplary embodiment of the invention provides the method in which, the second GUI widget comprises a paused window, and the method further comprises, in response to the user left clicking the paused window, displaying an active window.

Yet another exemplary embodiment of the invention provides the method in which, the second GUI widget comprises a paused task button, and the method further comprises displaying a task button associated with an active window in response to the user left clicking the paused task button.

Yet another exemplary embodiment of the invention provides the method in which, the pausing of the open application program is implemented by an Application Program Interface (API) call from the open application program.

Yet another exemplary embodiment of the invention provides the method in which, to the resume running of the open application program is implemented by an API call that enables the state information to be restored when the open application program resumes running.

Yet another exemplary embodiment of the invention provides the method in which, the data associated with the open application program comprises a Document Object Model (DOM).

Yet another exemplary embodiment of the invention provides a method for dynamically freeing computer resources by a user in a multitasking and windowing environment, the method including: activating a first Graphical User Interface (GUI) widget to initiate pausing of an open application program; pausing Central Processing Unit (CPU) processing of code for the open application program; maintaining data associated with the open application program in main memory; storing state information for the program code, residing in the main memory, in mass storage; storing state information associated with a process of the open application program in the mass storage; and removing the program code from the main memory to the mass storage, when another open application program requires additional main memory.

Yet another exemplary embodiment of the invention provides the method in which, the first GUI widget comprises an inactive window, and the method further comprises displaying, in response to the user right clicking the inactive window, a paused window, which is visually distinguishable.

Yet another exemplary embodiment of the invention provides the method in which, the displaying the paused window further comprises changing the paused application window with changes in any of shape, color, location, shade, and graphics.

Yet another exemplary embodiment of the invention provides the method in which, the first GUI widget comprises a task button, and the method further comprises displaying, in response to the user right clicking the task button, a pop-up window including an option of pausing.

Yet another exemplary embodiment of the invention provides the method in which, in response to the option of pausing, the method further comprises displaying a paused task button, which is visually distinguishable.

Yet another exemplary embodiment of the invention provides the method in which, the displaying the paused task button further comprises changing the paused task button with changes in any of shape, color, size, shade, and graphics.

Yet another exemplary embodiment of the invention provides a program storage device readable by machine, tangibly embodying a program of instructions executable by the machine to perform a method for dynamically freeing computer resources by a user in a multitasking and windowing environment, the method including: inputting, from a user, a first input to activate a first Graphical User Interface (GUI) widget, associated with an open application program, to initiate pausing of the open application program; pausing Central Processing Unit (CPU) processing of program code for the open application program; maintaining data associated with the open application program, at a time of pausing, in main memory; storing first state information, associated with the program code of the open application program and residing in the main memory at the time of pausing, in mass storage; at the time of pausing, storing second state information, associated with a process of the open application program and received from a software module that monitors running applications and processes, in the mass storage; removing the program code of the open application program, which is paused, from the main memory to the mass storage, to dynamically free computer resources for the user when another open application program running in the multitasking and windowing environment requires additional main memory; inputting, from the user, a second input to a second GUI widget, associated with pausing the open application program, to resume running of the open application program; restoring the first state information, associated with the program code of the open application and stored in the mass storage, to the main memory before the open application program resumes running; restoring the second state information, associated with the process of the open application program and stored in the mass storage, to the main memory for access by the software module that monitors running applications and processes before the open application program resumes running; and resuming the CPU processing of the program code for the open application program.

Yet another exemplary embodiment of the invention provides the program storage device performing the method, in which the first GUI widget comprises an inactive window corresponding to the open application program, and the method further comprises displaying, in response to the user right clicking the inactive window, a paused window, which is visually distinguished from any of an inactive window and an active window.

Yet another exemplary embodiment of the invention provides the program storage device performing the method, in which the first GUI widget comprises a task button corresponding to the open application program, and the method further comprises displaying, in response to the user right clicking the task button, a pop-up window including an option of pausing.

Yet another exemplary embodiment of the invention provides the program storage device performing the method, in which in response to the user selecting the option of pausing, the method further comprises displaying a paused task button, which is visually distinguished from a task button associated with an active window, a minimized window, and an inactive window.

Yet another exemplary embodiment of the invention provides the program storage device performing the method, in which the second GUI widget comprises a paused window, and the method further comprises, in response to the user left clicking the paused window, displaying an active window.

Yet another exemplary embodiment of the invention provides the program storage device performing the method, in which the second GUI widget comprises a paused task button, and the method further comprises displaying a task button associated with an active window in response to the user left clicking the paused task button.

Yet another exemplary embodiment of the invention provides the program storage device performing the method, in which the data associated with the open application program comprises a Document Object Model (DOM).

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The exemplary embodiments of the invention will be better understood from the following detailed description with reference to the drawings, in which.

DETAILED DESCRIPTION OF EMBODIMENTS

Figure 1:
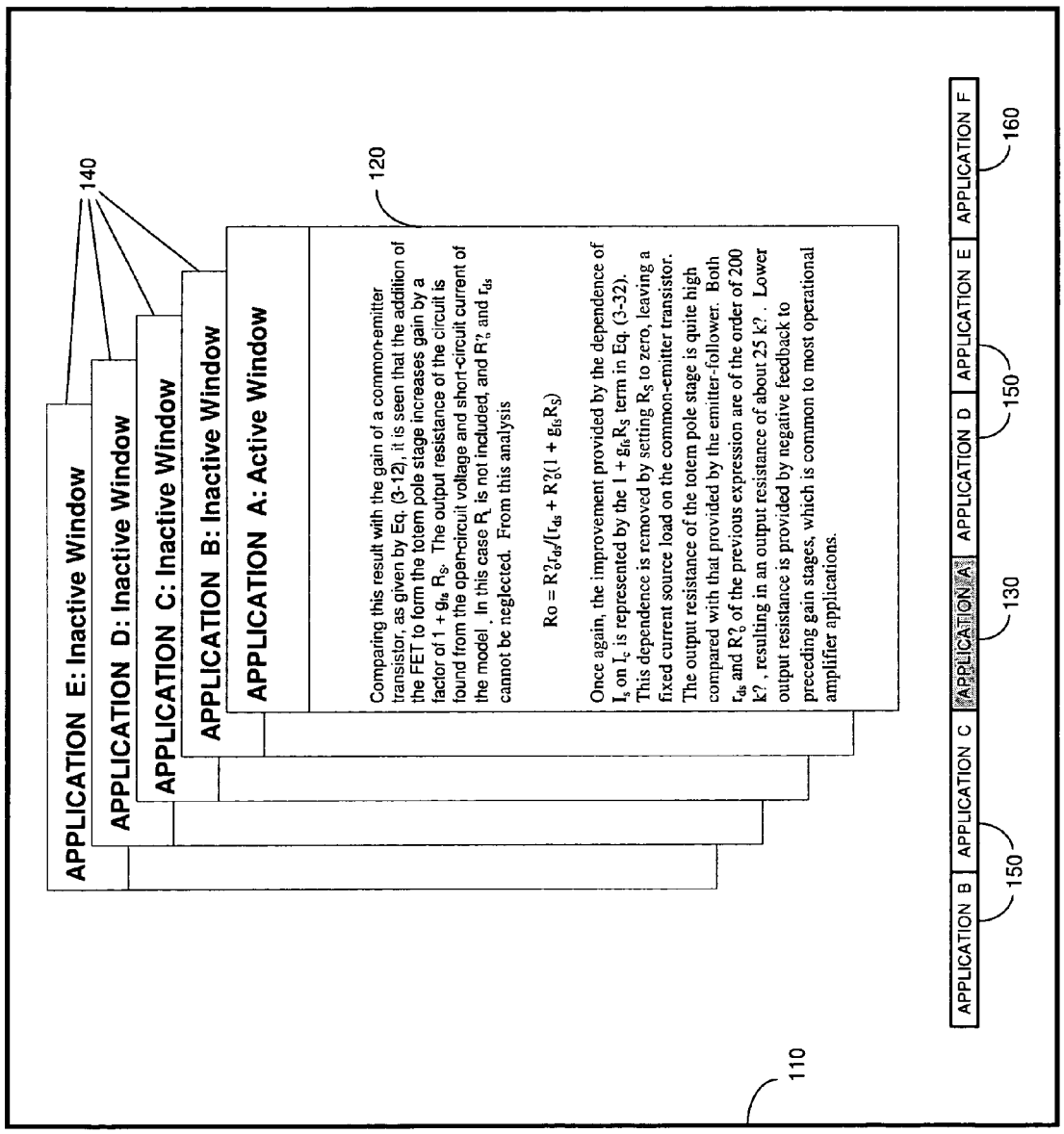
FIG. 1 schematically illustrates a display screen displaying an active window and inactive windows, associated with open application programs, and task buttons, corresponding to the active window, the inactive windows, and a minimized window in an exemplary embodiment of the invention.

The exemplary embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the exemplary embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

As stated above, there remains a need to overcome the problem of the slowing down of open application programs, when multiple application programs are open, without necessarily closing one or more of the open application programs, and while maintaining a display presence of each of the open applications for the user.

The embodiments of the invention provide a method and system for dynamically freeing computer resources by a user in a multitasking and windowing environment by pausing one or more open application programs as explained below. Referring now to the drawings, and more particularly to FIGS. 1 through 4, where similar reference characters denote corresponding features consistently throughout the figures, there are shown exemplary embodiments of the invention.

Figure 2:
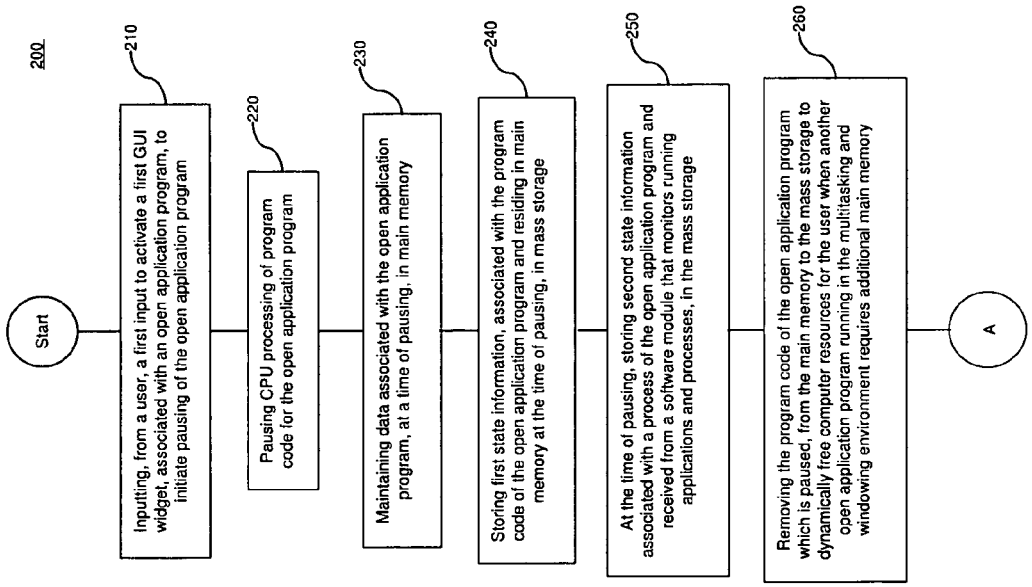
FIG. 2 illustrates a flow chart of a method for dynamically freeing computer resources by pausing an open application program in an exemplary embodiment of the invention.

As shown in FIG. 2, according to an exemplary method 200 of an embodiment of the invention, a user may input a first input to activate a Graphical User Interface (GUI) widget, associated with an open application program, to initiate pausing of the open application program 210, as explained below. The GUI widget may comprise, for example, an inactive application window or a task button corresponding to the inactive application window.

In an exemplary embodiment of the invention, pausing the open application program includes pausing, that is, stopping, the central processing unit (CPU) from further processing of the open application program 220. That is, the CPU does not process or further implement program code associated with the open application program when paused.

Pausing may also include, for example, maintaining data associated with the open application program at the time of pausing in main memory 230 in an exemplary embodiment of the invention. An example of such data that may be maintained in main memory is a Document Object Model (DOM) associated with an open web browser page at the time of pausing. Pausing may further include storing state information associated with program code of the open application program, which resides in main memory at the time of pausing, in mass storage 240. Pausing the open application program may yet further include storing state information associated with one or more states of processes of the open application program, which is received from a software module, for example, Windows® Task manager, that monitors the computer system's resources and displays, for example, running applications and processes, along with information about how much memory and what percentage of the CPU's processing each process is using. At the time of pausing, state information associated with a process of the open application program, which is received from the software module that monitors running of applications and processes, may be stored in mass storage 250.

In an exemplary embodiment of the invention, when the open application program is paused, as described above, subsequent processing of another open application program that is running in the multitasking and windowing environment and that requires additional main memory may dynamically free computer resources by removing program code of the open application program, which is paused, from main memory and storing the removed program code in mass storage 260.

Figure 3:
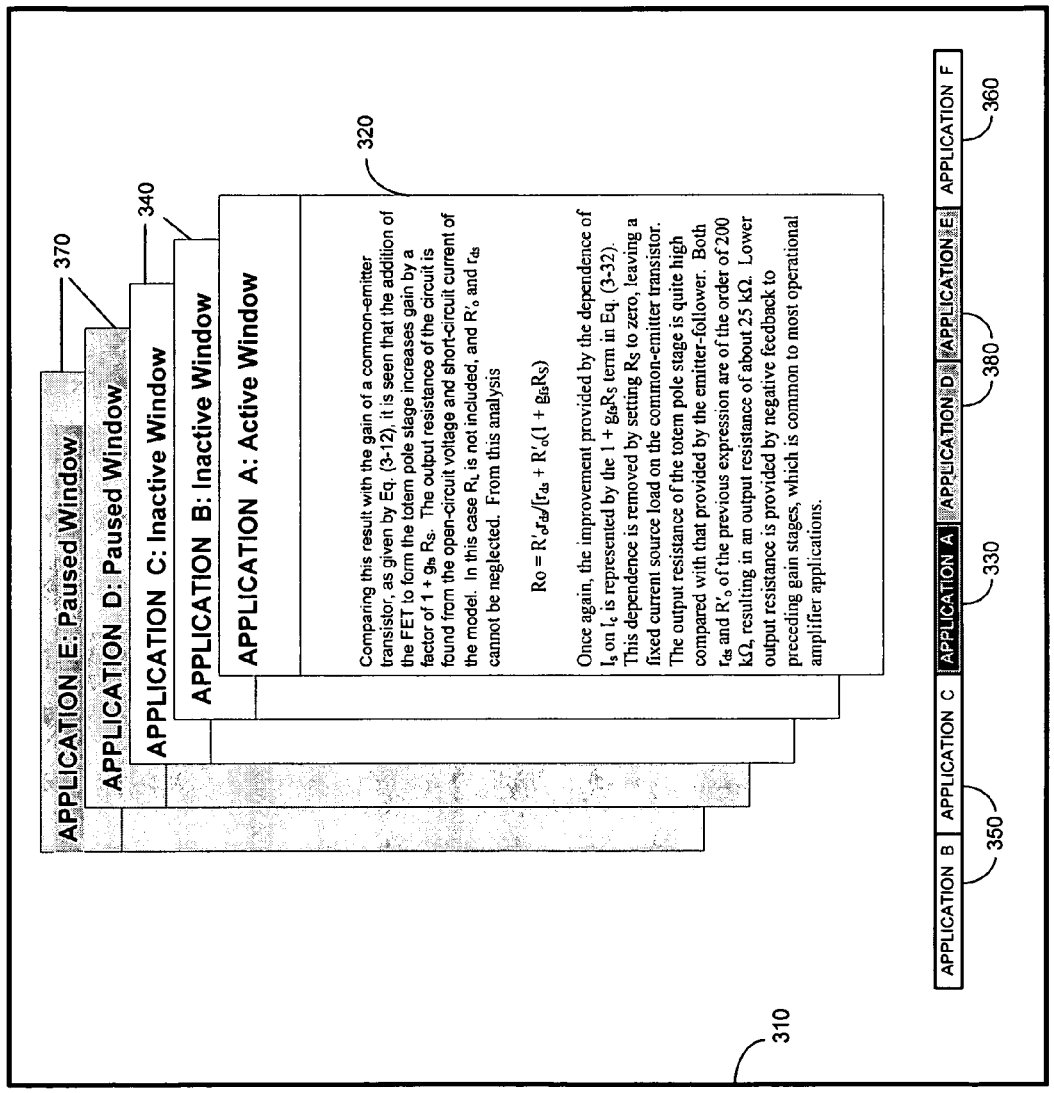
FIG. 3 schematically illustrates a display screen displaying an active window, inactive windows, and paused windows, associated with open application programs, and task buttons, corresponding to the active window, the inactive windows, the paused windows, and a minimized window in an exemplary embodiment of the invention.

As shown in FIG. 3, activating a GUI widget by, for example, right clicking an inactive window, may initiate pausing of an open application program, corresponding to the inactive window, and may display a paused window 370 and a corresponding paused task button 380 in the display screen 310 in an exemplary embodiment of the invention. Upon pausing, the content of the paused window 370 may, for example, be fixed. The paused window 370 may be visually distinguished from an inactive window 340 and an active window 320 and alerts the user to the window's and the corresponding open application program's paused status. A paused window 370 may be distinguished from an inactive window 340 and an active window 320 by, for example, shading the paused window 370 or by differences in any of shape, color, screen location, and graphic content. Similarly, a task button 380 associated with a paused window 370 may be visually distinguished from a task button 330 associated with the active window 320 and a task button 350, 360 associated with either an inactive window 340 or a minimized window, respectively. During the relatively short process of pausing the open application program, the inactive window 340 may, for example, transition from an inactive window 340 to a paused window 370 through graphical animation.

Activating another GUI widget, for example, by right clicking a task button associated with either an inactive or minimized window, may also initiate pausing of an open application program, corresponding to either the inactive or minimized window, and may display a pop up window including an option of pausing the open application program in an exemplary embodiment of the invention. Selecting the option of pausing may then cause the open application program to pause and to display a paused task button 380, which is visually distinguished from a task button 330, 360, 340 corresponding to an active window, a minimized window, or an inactive window, respectively. A paused task button 380 may be visually distinguished by, for example, differences in any of shape, color, shade, and graphic content. Selecting the pausing option also may cause the corresponding inactive application window to display a paused window 370, in which the contents are fixed. During the relatively short process of pausing the open application program, the task button 360, 350 corresponding to a minimized or inactive window, respectively, may, for example, transition to a paused task button 380 through graphic animation.

After pausing a user selected open application program, a user may subsequently resume running of the paused open application program as explained below.

Figure 4:
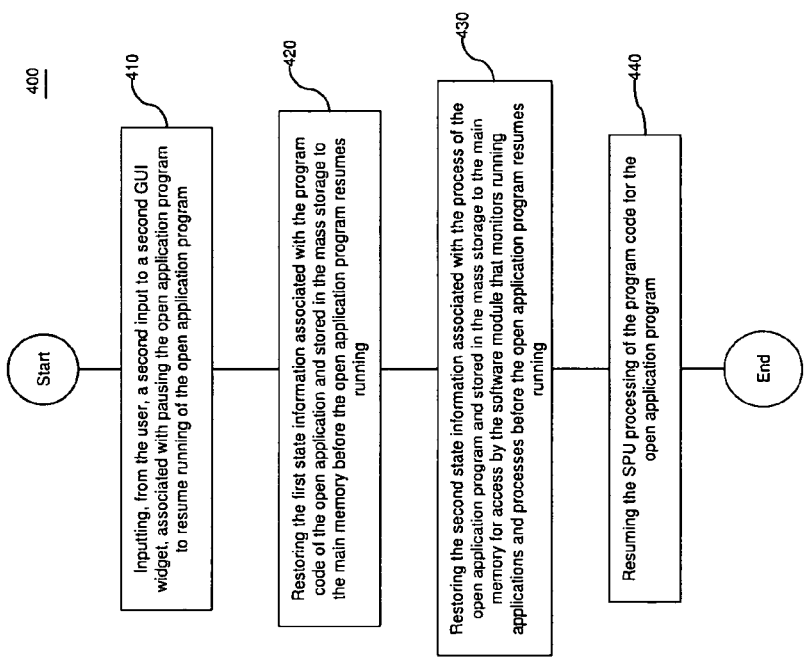
FIG. 4 illustrates a flow chart, connected to the flow chart of FIG. 2, which further illustrates a method for resuming the running of an open application program, which is paused, in an exemplary embodiment of the invention.

As shown in FIG. 4, according to an exemplary method 400 of an embodiment of the invention, the user may input a second input to a GUI widget, associated with pausing the open application program by, for example, left clicking on the paused window or the paused task button, associated with the paused open application program, to resume running of the open application program 410. Resuming the running of the paused open application program may also include restoring the state information, associated with the program code of the paused open application program, from mass storage to main memory before resuming the running of the frozen open application program 420. Resuming the running of the paused open application program may further include restoring the state information, associated with the process of the open application program and stored in the mass storage, to the main memory for access by the software module that monitors running applications and processes before the open application program resumes running 430. Lastly, resuming the running of the paused open application program may yet further include resuming the CPU processing of the program code for the open application program 440.

Upon resuming the running of the paused open application program, a paused window may transition to an active window and a paused task button may transition to a task button associated with the active window corresponding to the open application program. During the relatively short process of resuming the running of the paused open application program, the paused window and the paused task button may, for example, transition to the active window and the task button associated with the active window, respectively, through graphic animation.

In an exemplary embodiment of the invention, when an inactive application window is paused, resulting in a paused window, the paused window's content may be fixed. While paused, GUI widgets, for example, active, inactive and paused windows and their corresponding task buttons, may be subject to GUI events, for example, resizing, minimizing or maximizing a paused application window, a mouse-over event, and a left or right mouse click, which may be implemented by the operating system as is well known in the art. The operating system may provide the associated default response for resizing, minimizing or maximizing a paused window or for a mouse-over event without resuming the running of the paused open application program. On, for example, a left click to a paused window or a paused task button, initiating the resumption of running the paused open application program may be followed by a slight delay, caused by swapping state information and program code from mass storage to main memory. In this case, the slight delay experienced by the user is less than that of re-starting a formerly closed application program or starting a new application program.

Thus, the ability to pause and resume the running of a paused open application program offers a solution to the problem of the slowing down of open application programs, when multiple application programs are open, without necessarily closing one or more application programs and while maintaining a display presence of each of the application programs for the user, at a cost to the user of the slight delay associated with the resumption of running a paused open application program.

Consider, for example, a situation where a user may open multiple web browser windows because he or she needs to refer to several web pages. Each browser window may be associated with multiple data structures, including one or more document object models (DOMs), and all of these data structures may fill or even overflow physical memory; thus, slowing the web browser windows. Replacing some of the web browser windows by paused windows that display their fixed contents, reflecting their states at the time when the CPU was paused, and removing all the associated program code from main memory to mass storage, may free a substantial amount of main memory and CPU processing to the benefit of other open applications, while maintaining a display presence of these paused open application programs for the user.

An exemplary embodiment of the invention may free other resources besides those of main memory and CPU processing, as described above. Display space on the display screen may be freed by reducing the size of one or more paused windows or even by minimizing the paused windows.

Figure 5:
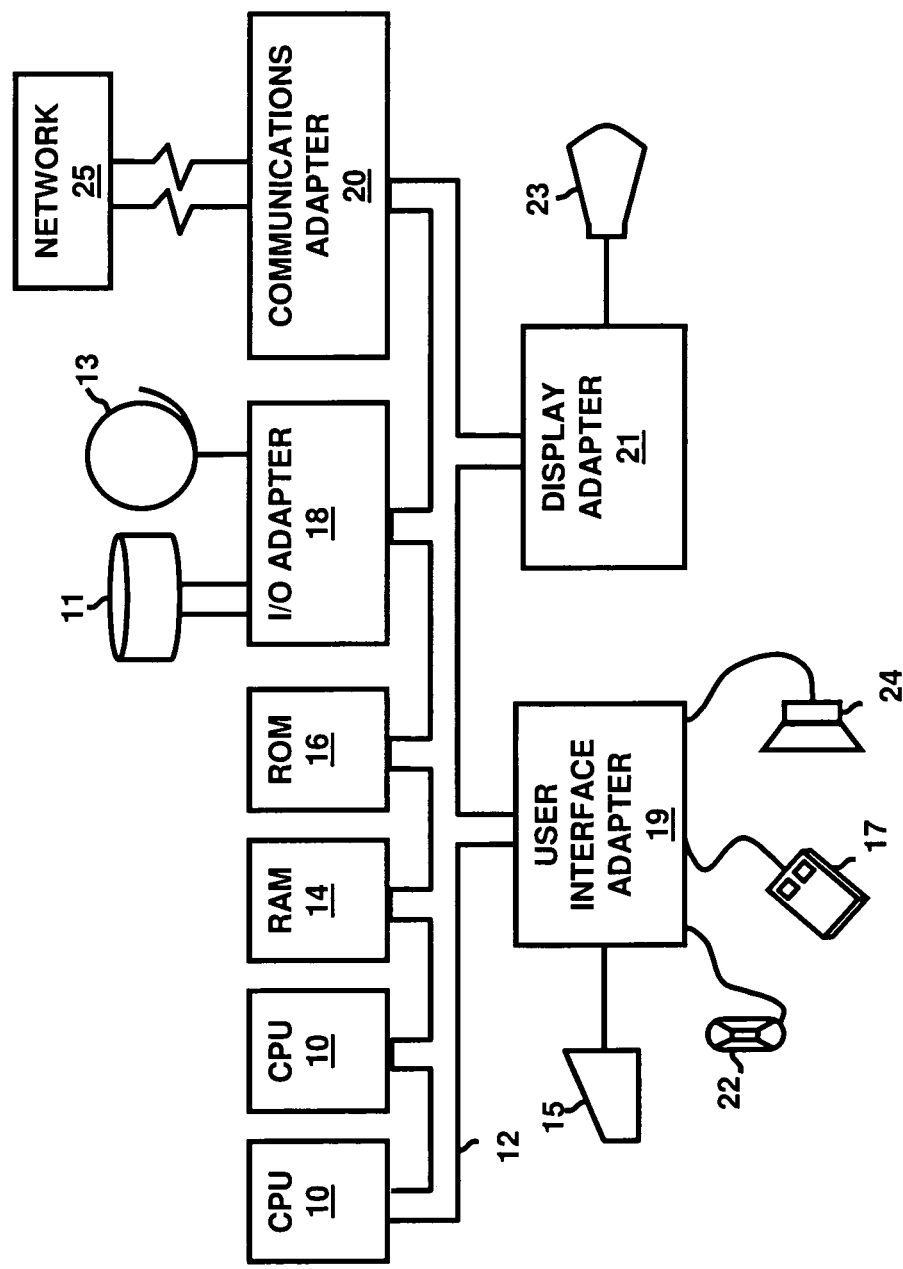
FIG. 5 schematically illustrates an exemplary hardware configuration of an information handling/computer system and program storage device in accordance with an exemplary embodiment of the invention.

A representative hardware system and structure for practicing an exemplary embodiment of the invention is depicted in FIG. 5. This schematic drawing illustrates an exemplary hardware configuration of an information handling/computer system in accordance with an exemplary embodiment of the invention. This system may include at least one processor or central processing unit (CPU) 10. The CPUs 10 may be interconnected via a system bus 12 to various devices such as a random access memory (RAM) 14, read-only memory (ROM) 16, and an input/output (I/O) adapter 18. The I/O adapter 18 may connect to peripheral devices, such as mass storage devices, including hard disk drives 11, tape drives 13, or other program storage devices that are readable by the system. The system may read the inventive instructions on the program storage devices and follow these instructions to execute the methodology of the invention. A user interface adapter 19 may connect a keyboard 15, mouse 17, speaker 24, microphone 22, and/or other user interface devices to the bus 12 to gather user input. The mouse 17 may implement left and right clicks. In addition, a communication adapter 20 may connect the information handling system to a data processing network 25, and a display adapter 21 may connect the bus 12 to a graphical user interface (GUI) 23 or other similar output device.

The foregoing description of the exemplary embodiments will so fully reveal the general nature of the invention that others can, by applying current knowledge, readily modify and/or adapt for various applications such exemplary embodiments without departing from the generic concept, and, therefore, such adaptations and modifications should and are intended to be comprehended within the meaning and range of equivalents of the disclosed exemplary embodiments. It is to be understood that the phraseology or terminology employed herein is for the purpose of description and not of limitation. Therefore, while the exemplary embodiments of the invention have been described in terms of preferred embodiments, those skilled in the art will recognize that the exemplary embodiments of the invention can be practiced with modification within the spirit and scope of the appended claims.

What is claimed is:

1. A method of dynamically freeing computer resources by a user in a multitasking and windowing environment, said method comprising:
    receiving, by a computer, input from said user to activate a Graphical User Interface (GUI) widget comprising an inactive window of an open application program in main memory, to initiate pausing of said open application program;
    pausing, by said computer, Central Processing Unit (CPU) processing of program code of said open application program in said main memory;
    maintaining at said pausing, by said computer, a Document Object Model (DOM) implemented by said program code and associated with said open application program in said main memory without closing said open application program;
    storing in mass storage at said pausing, by said computer, first state information associated with said program code of said open application program residing in said main memory;
    storing in said mass storage at said pausing, by said computer, second state information associated with a process of said open application program and received from a software module that monitors running applications and processes; and
    removing at said pausing, by said computer, said program code, other than that implementing said DOM, of said open application program, from said main memory, and storing said program code, other than that implementing said DOM, of said open application program in said mass storage, while maintaining said DOM implemented by said program code of said open application in said main memory, to dynamically free computer resources for said user when another open application program running in said multitasking and windowing environment requires additional main memory.

2. The method of claim 1,
    further comprising, displaying in response to said user right clicking said inactive window, a paused window, which is visually distinguished from said inactive window and a single active window.

3. The method of claim 2, said displaying of said paused window further comprising visually distinguishing said paused window by differences in any of shape, color, location, shade, and graphics.

4. The method of claim 1,
    said GUI widget further comprising a task button corresponding to said open application program; and
    said method further comprising, displaying in response to said user right clicking said task button, a pop-up window including an option of pausing.

5. The method of claim 4, in response to said user selecting said option of pausing, said method further comprising displaying a paused task button, which is visually distinguished from a task button associated with a single active window, a minimized window, and said inactive window.

6. The method of claim 5, said displaying of said paused task button further comprising visually distinguishing said paused task button by differences in any of shape, color, size, shade, and graphics.

7. A method of dynamically freeing computer resources by a user in a multitasking and windowing environment, said method comprising:
    receiving, by a computer, a first input from said user to activate a first Graphical User Interface (GUI) widget comprising an inactive window of an open application program in main memory, to initiate pausing of said open application program;
    pausing, by said computer, Central Processing Unit (CPU) processing of program code for said open application program in said main memory;
    maintaining at said pausing, by said computer, a Document Object Model (DOM) implemented by said program code and associated with said open application program in said main memory without closing said open application program;
    storing in mass storage at said pausing, by said computer, first state information associated with said program code of said open application program residing in said main memory;
    storing in said mass storage at said pausing, by said computer, second state information associated with a process of said open application program and received from a software module that monitors running applications and processes;
    removing at said pausing, by said computer, said program code, other than that implementing said DOM of said open application program, from said main memory, and storing said program code, other than that implementing said DOM of said open application program, in said mass storage, while maintaining said DOM implemented by said program code of said open application in said main memory, to dynamically free computer resources for said user when another open application program running in said multitasking and windowing environment requires additional main memory;
    displaying, by said computer, in response to said user right clicking said inactive window, a paused window, which is visually distinguished from said inactive window and a single active window;
    receiving, by said computer, a second input from said user to activate a second GUI widget, comprising said paused window of said open application program, which is paused, to resume processing of said open application program;
    restoring, by said computer, said first state information, associated with said program code of said open application, which is paused, and stored in said mass storage, to said main memory before said open application program, which is paused, resumes processing;
restoring, by said computer, said second state information, associated with said process of said open application program, which is paused, and stored in said mass storage, to said main memory for access by said software module that monitors running applications and processes before said open application program, which is paused, resumes processing; and
resuming, by said computer, said CPU processing of said program code for said open application program, which was paused, with said data structure DOM of said open application that was maintained in said main memory.

8. The method of claim 7,
further comprising, displaying in response to said user left clicking said paused window, said single active window.

9. The method of claim 7,
said second GUI widget further comprising a paused task button; and
said method further comprising, displaying an active task button associated with said single active window in response to said user left clicking said paused task button.

10. The method of claim 7, said pausing of said open application program being implemented by an Application Program Interface (API) call from said open application program.

11. The method of claim 7, said resuming of said CPU processing of said open application program being implemented by an API call that enables said first state information and said second state information to be restored when said open application program resumes running.

12. A method of dynamically freeing computer resources by a user in a multitasking and windowing environment, said method comprising:
activating, by a computer, a Graphical User Interface (GUI) widget comprising an inactive window of an open application program in main memory upon receiving input by said user, to initiate pausing of said open application program;
pausing, by said computer, Central Processing Unit (CPU) processing of program code of said open application program in said main memory;
maintaining at said pausing, by said computer, a Document Object Model (DOM) implemented by said program code and associated with said open application program in main memory without closing said open application program;
storing in mass storage at said pausing, by said computer, first state information associated with said program code of said open application program residing in said main memory;
storing in mass storage at said pausing, by said computer, second state information associated with a process of said open application program that monitors running applications and processes; and
removing at said pausing, by said computer, said program code, other than that implementing said DOM of said open application program, from said main memory, and storing said program code, other than that implementing said DOM of said open application program, in said mass storage, while maintaining said DOM of said open application in said main memory, when another open application program requires additional main memory.

13. The method of claim 12,
further comprising, displaying in response to said user right clicking said inactive window, a paused window, which is visually distinguishable.

14. The method of claim 13, said displaying of said paused window further comprising distinguishing said paused window with changes in any of shape, color, location, shade, and graphics.

15. The method of claim 12,
said GUI widget further comprising a task button; and
said method further comprising, displaying in response to said user right clicking said task button, a pop-up window including an option of pausing.

16. The method of claim 15, in response to said option of pausing, said method further comprising displaying a paused task button, which is visually distinguishable.

17. The method of claim 16, said displaying of said paused task button further comprising distinguishing said paused task button with changes in any of shape, color, size, shade, and graphics.

18. A non-transitory program storage device readable by a computer, tangibly embodying a program of instructions executable by said computer to perform a method for dynamically freeing computer resources by a user in a multitasking and windowing environment, said method comprising:
receiving a first input from said user to activate a first Graphical User Interface (GUI) widget comprising an inactive window of an open application program in main memory, to initiate pausing of said open application program;
pausing Central Processing Unit (CPU) processing of program code for said open application program in said main memory;
maintaining at said pausing, a Document Object Model (DOM) implemented by said program code and associated with said open application program in said main memory without closing said open application program;
storing in mass storage at said pausing, first state information associated with said program code of said open application program residing in said main memory;
storing in mass storage at said pausing, second state information associated with a process of said open application program and received from a software module that monitors running applications and processes;
removing at said pausing, said program code, other than that implementing said DOM of said open application program, from said main memory, and storing said program code, other than that implementing said DOM of said open application program, in said mass storage, while maintaining said DOM implemented by said program code of said open application in said main memory, to dynamically free computer resources for said user when another open application program running in said multitasking and windowing environment requires additional main memory;
displaying, by said computer, in response to said user right clicking said inactive window, a paused window, which is visually distinguished from said inactive window and a single active window;
receiving a second input from said user to activate a second GUI widget comprising said paused window of said open application program, which is paused, to resume processing of said open application program;
restoring said first state information, associated with said program code of said open application, which is paused, and stored in said mass storage, to said main memory before said open application program, which is paused, resumes processing;

restoring said second state information, associated with said process of said open application program, which is paused, and stored in said mass storage, to said main memory for access by said software module that monitors running applications and processes before said open application program, which is paused, resumes processing; and resuming said CPU processing of said program code for said open application program, which was paused, with said DOM of said open application that was maintained in said main memory.

19. The program storage device of claim 18 performing said method further comprising, displaying in response to said user right clicking said inactive window, a paused window, which is visually distinguished from said inactive window and a single active window.

* * * * *